(12) United States Patent
Baker

(10) Patent No.: US 7,017,159 B1
(45) Date of Patent: Mar. 21, 2006

(54) SMART BOOKMARKS FOR SMALL FOOTPRINT DEVICE APPLICATIONS

(75) Inventor: Mark Baker, Ottawa (CA)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/333,421

(22) Filed: Jun. 15, 1999

(51) Int. Cl.
*G06F 9/46* (2006.01)

(52) U.S. Cl. .................................... 719/310

(58) Field of Classification Search ............ 709/3, 709/206, 207; 719/3, 320, 328, 331, 332, 719/310; 455/91, 556.2; 715/501.1
See application file for complete search history.

(56) References Cited

U.S. PATENT DOCUMENTS

| | | | |
|---|---|---|---|
| 5,895,471 A | | 4/1999 | King et al. |
| 6,032,162 A | * | 2/2000 | Burke ...................... 715/501.1 |
| 6,185,611 B1 | * | 2/2001 | Waldo et al. ............... 709/221 |
| 6,208,839 B1 | * | 3/2001 | Davani ....................... 340/7.2 |
| 6,249,844 B1 | * | 6/2001 | Schloss et al. .............. 711/122 |
| 6,266,539 B1 | * | 7/2001 | Pardo ...................... 455/556.2 |
| 6,272,531 B1 | * | 8/2001 | Shrader ...................... 709/206 |
| 6,349,344 B1 | * | 2/2002 | Sauntry et al. ............. 709/332 |
| 6,356,956 B1 | * | 3/2002 | Deo et al. .................. 719/318 |
| 6,430,599 B1 | * | 8/2002 | Baker et al. ............... 709/203 |
| 6,631,496 B1 | * | 10/2003 | Li et al. ................... 715/501.1 |
| 6,637,021 B1 | * | 10/2003 | Dubey ....................... 717/108 |
| 6,886,173 B1 | * | 4/2005 | Cutlip ....................... 719/328 |

OTHER PUBLICATIONS

Jini, "Jini Architecture Specification", Jan. 1999, 1.0, pp. 1-22.*

Steve Mann, "JavaOS: An Operating System for Small Devices", 96, pp. 1-6.*
Calder et al., "JavaBeans™ Activation Framework Specification, Version 1.0a," May 1999, pp. 1-36.
"Jini™ Architectural Overview," Technical White Paper, © 1999 Sun Microsystems, Inc., pp. 1-23.
Search Report for Ref. P009140EP, Application No. 00304784.2-1225, May 2, 2005.
"Personal Java 1.1 Application Environment Memory Usage Technical Note," Sun Microsystems, pp. 1-4, Jul. 1998.
"Jini Device Architecture Specification," Sun Microsystems, pp. 1-14, Jan. 25, 1999.

* cited by examiner

*Primary Examiner*—Sue Lao
(74) *Attorney, Agent, or Firm*—Meyertons Hood Kivlin Kowert & Goetzel, P.C.; B. Noël Kivlin

(57) ABSTRACT

Users of small footprint devices such as smart cellular phones, personal data assistants, etc. may create and store bookmarks referencing various types of objects and/or data sources. Each bookmark may comprise a Uniform Resource Locator (URL) which may be used to refer to the object/data source. The bookmark system may be open-ended, allowing virtually any type of object or data source to be bookmarked. The bookmarks may later be used by a user or application to reference the respective data source to perform some type of action on the data source, such as displaying or editing it. A lightweight application/service containment framework is described which enables services to run on small footprint devices. A bookmark service may cooperate with an activation framework capable of encapsulating various types of entities. In one embodiment, a bookmark service operates in conjunction together with the JavaBeans™ Activation Framework (JAF) to implement the bookmark functionality.

15 Claims, 14 Drawing Sheets

SMART BOOKMARKS FOR SMALL FOOTPRINT DEVICE APPLICATIONS

BACKGROUND OF THE INVENTION

1. Field of the Invention

This invention relates generally to computer application programs and small footprint devices. More particularly, the invention comprises a system and method for bookmarking various types of data source objects for use by applications and services running on a small footprint device.

2. Description of the Relevant Art

The field of "smart" small footprint devices is growing and changing rapidly. Small footprint devices include hand-held computers, personal data assistants (PDAs), cellular phones, global positioning system (GPS) receivers, game consoles, and many more such devices. These devices are becoming more intelligent and interconnected. Technologies such as Jini™ from Sun Microsystems, Inc. and initiatives such as the Open Service Gateway Initiative (OSGI) are expanding the traditional concepts of computer networks to include small footprint devices.

This increased device interconnection has introduced a need for both new types of computing services and new ways to integrate computing services, both inter-device-based and intra-device-based services. A "service" is an entity implemented within or accessible from a device that can be used by a person, an application, or another service. The concept of a service is broad and can be considered at many different scales. For example, services include familiar network-based services such as shared printing, email, telephony, etc. Services also include less familiar examples such as an energy management service which may control the power consumption of devices within a local network, a diagnostic service which allows a device to send information to a service technician when an error occurs, a health-monitoring service which immediately notifies health professionals of an emergency, etc.

Services also include modules or applications located and executable within a local machine or device. For example, local application programs may utilize a service to communicate with an HTTP server, an HTML render engine service, a bookmark service, a user interface service, etc. In this example, an application program may use these services together to implement a web browser program.

It is becoming more common today to execute multiple services and applications together in a single small footprint device. However, since memory, processing power, and other resources are typically very limited in small footprint devices, a specialized lightweight service/application containment framework is necessary to achieve the desired integration of services and applications. It is also desirable that the containment framework be flexible and extendable enough to provide a framework for any types of services and applications for any kind of small footprint device. A further goal may be that the containment framework be compatible and integrated with off-device services such as services available to devices in a Jini™ network. The containment framework described herein achieves the above-stated goals.

The lightweight containment framework may enable small footprint devices such as personal data assistants, smart cellular phones, etc. to run the types of multi-purpose application programs traditionally associated with desktop computing environments. For example, the Personal Applications suite available from Sun Microsystems, Inc. is built around one embodiment of the containment framework. The Personal Applications suite comprises an integrated set of compact, memory-efficient applications, including the Personal Applications Browser, the Personal Applications Email Client, and the Personal Organizer.

As these types of applications become available for small footprint devices, it becomes increasingly desirable to provide a general mechanism to integrate and abstract entities, objects, and data sources used by or implemented in various applications or services. One approach for enabling this type of abstraction and integration is to enable a bookmark service to provide a persistent reference to any of various types of entities, objects, and data sources which may be created or used in application programs or services. For example, a user may bookmark a particular piece of email or a particular contact entry from a contact list for convenient reference later.

Enabling this type of bookmark system is particularly desirable within a small footprint device environment. Such a system may significantly reduce the level of difficulty involved in performing particular operations, since the means for user input on a small footprint device are often very limited. However, implementing this type of bookmark system is also a particular challenge for a small footprint device environment, since a certain level of software infrastructure is necessary to achieve the desired abstraction and generality, yet the software infrastructure must be sufficiently lightweight to run on a small footprint device. A system and method for implementing this type of bookmark system for a small footprint device is described herein.

SUMMARY OF THE INVENTION

The present invention enables small footprint device users to create and store bookmarks referencing various types of objects and/or data sources (collectively referred to herein as data sources). Each bookmark may comprise a Uniform Resource Locator (URL) which may be used to refer to the object/data source. The bookmark system may be open-ended, allowing virtually any type of object or data source to be bookmarked. The bookmarks may later be used by a user or application to reference the respective data source to perform some type of action on the data source, such as displaying or editing it.

For example, a user may bookmark a particular piece of email from within an email client. In this case, the bookmark may reference some type of encapsulating object, referred to as a data source, which comprises data representing the email. Thus, the bookmark service may cooperate with an activation framework capable of encapsulating various types of entities. The activation framework may assign a type to a data source which distinguishes it from other kinds of data sources. The activation framework may also allow particular "verbs" to be associated with a data source type, and a particular executable module or routine may be associated with a data source type and verb, where the executable module may be invoked to perform the action designated by the verb for a particular data source.

A bookmark service module executes within an application/service containment framework of a small footprint device, which may be invoked by other applications/services in order to create and store a bookmark referencing a particular data source. A lightweight application/service framework for small footprint devices is described below. The bookmark service may operate in conjunction with an activation framework, as described above. In one embodiment, the bookmark service operates in conjunction together with the JavaBeans™ Activation Framework (JAF) to implement the described functionality.

BRIEF DESCRIPTION OF THE DRAWINGS

Other objects and advantages of the invention will become apparent upon reading the following detailed description and upon reference to the accompanying drawings in which.

Figure 1:
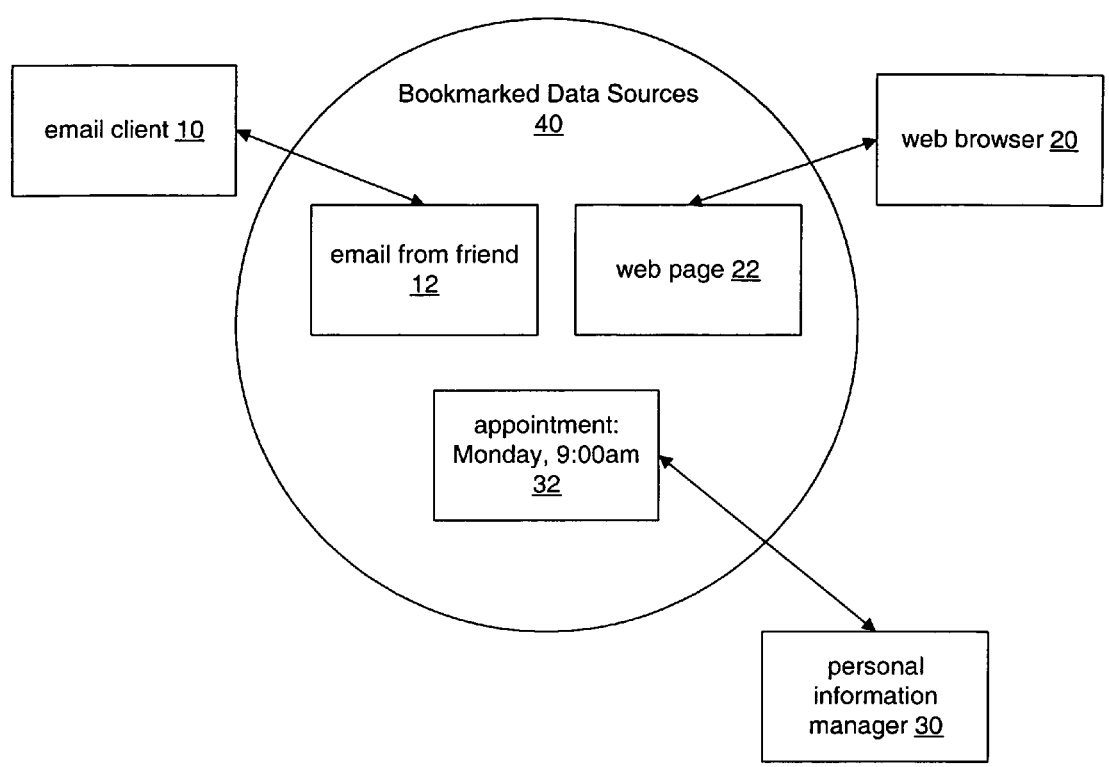
FIG. 1 is a block diagram illustrating various types of data sources which may be bookmarked.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1—Data Source Examples

FIG. 1 illustrates some examples of data sources which may be bookmarked. As described above, the bookmark service may operate in conjunction with an open activation framework allowing various types of data sources to be typed and encapsulated. FIG. 1 illustrates some exemplary types of data sources which users of typical application programs running on a small footprint device may wish to bookmark.

As illustrated in FIG. 1, a user may bookmark a particular piece of email 12. For example, the user may select a particular command while reading an email on an email client 10 which creates a bookmark for the email. The user may later quickly refer to the email using the bookmark. For example, the user may invoke a bookmark service which displays a list of bookmarks. FIG. 1 shows other data sources which may be bookmarked, such as a web page 22 bookmarked from within a web browser 20 and an appointment entry 32 bookmarked from within a personal information manager program 30.

Bookmarks may be organized in various ways. For example, a system may have a central list 40 where all bookmarks are kept, or separate applications may have their own bookmark lists, or various combinations of these approaches may be taken. The request to create a bookmark may occur in various situations, such as invoking a bookmark service and selecting a data source to bookmark, or issuing a command from within an application which invokes a bookmark service, etc. In one embodiment, bookmarks may be imported from another system.

The bookmarks of FIG. 1 may reference local or remote data sources. For example, the web page bookmark shown may reference an HTML page stored on a remote server, or the email bookmark shown may reference an email stored on another system.

Figure 2:
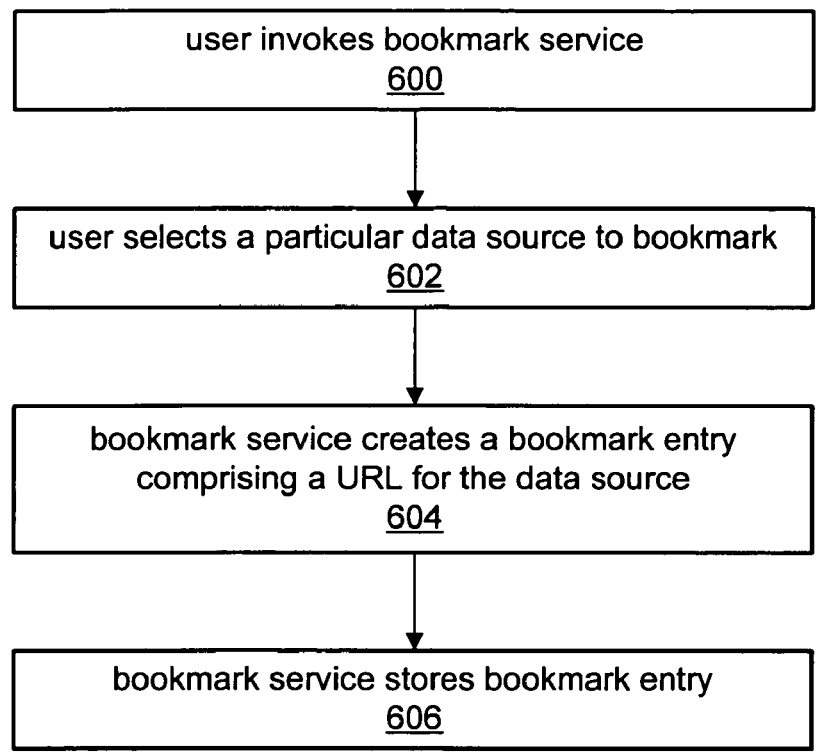
FIG. 2 is a flowchart diagram illustrating the process of creating a bookmark referencing a particular data source.

FIG. 2—Creating a Bookmark

FIG. 2 is a flowchart diagram illustrating the process of creating a bookmark referencing a particular data source. It is noted that FIG. 2 illustrates one embodiment of the bookmark creation process. Other embodiments are possible in which various steps are added, combined, modified, or omitted.

In step 600 of FIG. 2, the user invokes a bookmark service. For example, a user may issue a pulldown menu command to invoke a bookmark service, and a graphical user interface for the bookmark service may then appear on the display. In step 602, the user selects a particular data source to bookmark. For example, the user may browse through a directory structure to find a file comprising a particular type of data source, such as a virtual business card, an image, etc. Step 600 and step 602 may be combined into a single step. For example, the user may issue a command from within an application which instructs the bookmark service to bookmark a currently selected data source.

In step 604, the bookmark service creates a bookmark entry referencing the data source selected in step 602. The bookmark entry comprises information which identifies the particular data source selected in step 602. In one embodiment the bookmark entry comprises a URL.

In step 606, the bookmark service stores the bookmark entry created in step 604. For example, in one embodiment the bookmark entry may be stored in a central list of bookmarks which is accessible from the bookmark service itself and also accessible from other applications running in the system. In another embodiment, the system may maintain separate bookmark lists for different applications or data source types.

Figure 3:
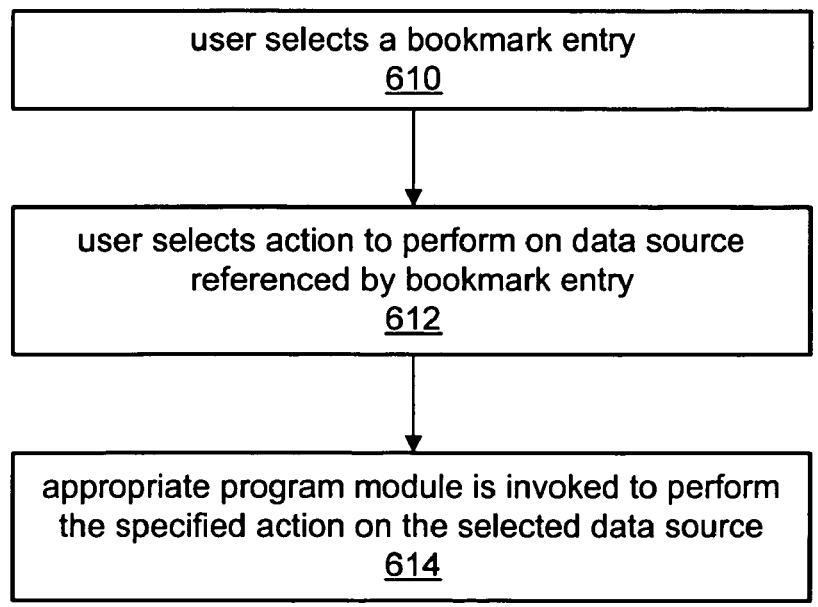
FIG. 3 is a flowchart diagram illustrating the process of using a bookmark to reference a respective data source.

FIG. 3—Referencing a Bookmarked Data Source

FIG. 3 is a flowchart diagram illustrating the process of using a bookmark to reference a respective data source. It is noted that FIG. 3 illustrates one embodiment of the process of referencing a bookmark. Other embodiments are possible in which various steps are added, combined, modified, or omitted.

In step 610 the user selects a bookmark entry. The bookmark selection may occur in various situations. For example, the user may invoke a bookmark service and select a particular bookmark entry from a list presented to the user by the bookmark service. The user may also select a particular bookmark from within an application, e.g., by selecting a particular menu item from a bookmark menu.

In step 612 the user selects an action to perform on the data source referenced by the bookmark entry selected in step 610. For example, a user may select an "edit" action for a bookmarked email, or a "view" action for a bookmarked image, etc. The user may select the action to perform by selecting from a list of possible actions, or the action to perform may be implicit from the context of the user's actions.

In step 614 an appropriate program module is invoked in order to perform the action specified in step 612 on the data source referenced by the bookmark entry selected in step 610. Steps 612 and 614 assume that an activation framework is present which enables actions to be defined for data source types and enables particular program modules to be mapped to those actions. In one embodiment, the bookmark service and/or application programs running within a small footprint device utilize the JavaBeans™ Activation Framework (JAF) to implement steps 612 and 614. The JavaBeans™ Activation Framework is described below.

Steps 610, 612, and 614 may be combined into a single step. For example, a user may access a menu from within a personal contact list service which displays a list of bookmarked personal contact entries. A user may then choose a contact entry from the menu, which causes the application to display the contact entry.

JavaBeans™ Application Framework

In one embodiment, the JavaBeans™ Activation Framework (JAF) is utilized to provide the infrastructure to encapsulate data sources, define actions for data sources, etc. This section describes the JavaBeans™ Activation Framework.

The JAF implements several related services including: determining the type of arbitrary data, encapsulating access to data, discovering the operations available on a particular type of data, and instantiating the software component that corresponds to the desired operation on a particular piece of data. The JAF is packaged as a Standard Extension to the Java™ platform.

Figure 4:
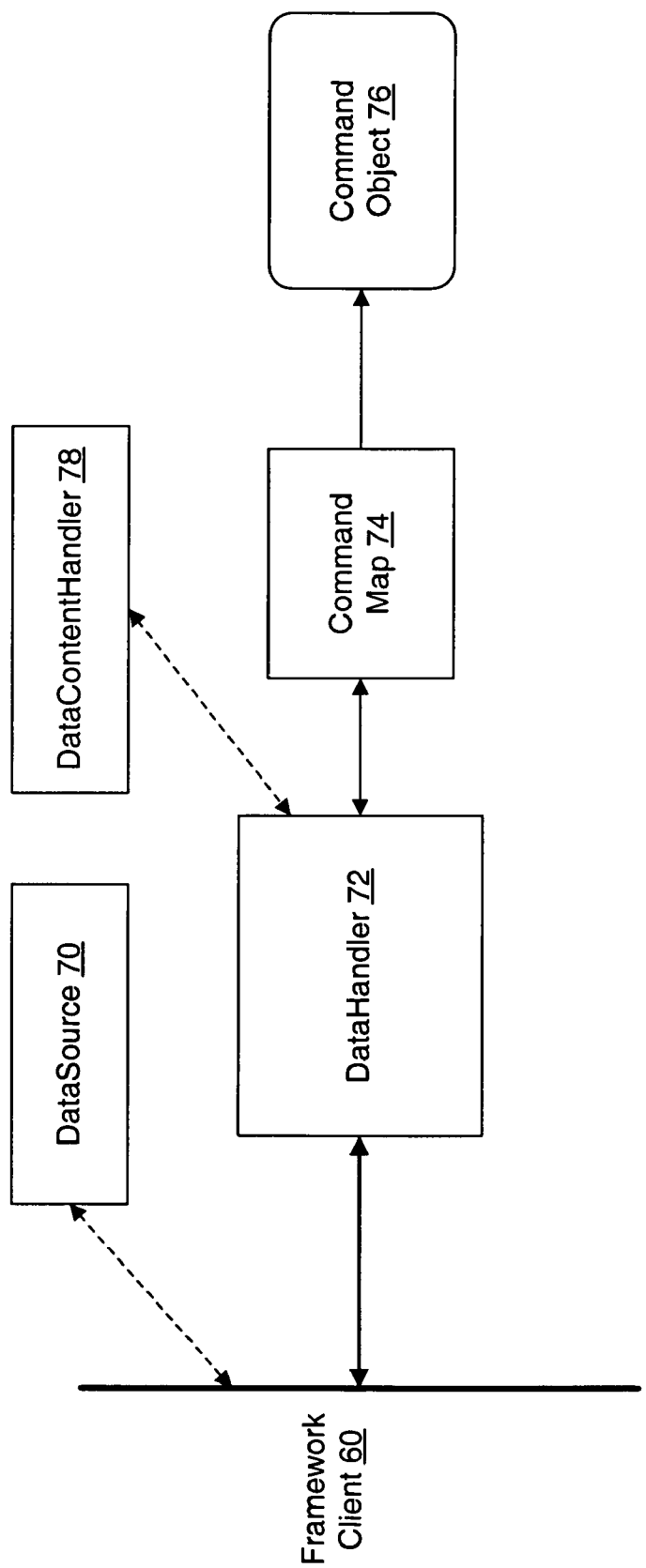
FIG. 4 is a block diagram illustrating the major elements comprising the JavaBeans™ Activation Framework architecture.

FIG. 4 illustrates the major elements comprising the JAF architecture. Note that the framework 60 shown here is not bound to a particular application.

The DataHandler 72 class shown in FIG. 4 provides a consistent interface between JAF-aware clients and other subsystems.

The DataSource 70 interface encapsulates an object that contains data, and that can return both a stream providing data access, and a string defining the MIME type describing the data. Classes can be implemented for common data sources (web, file system, IMAP, ftp etc.). The DataSource interface can also be extended to allow per data source user customizations. Once the DataSource is set in the DataHandler, the client can determine the operations available on that data.

The JAF includes two DataSource class implementations for convenience:

FileDataSource accesses data held in a file.

URLDataSource accesses data held at a URL.

The CommandMap 74 provides a service that allows consumers of its interfaces to determine the 'commands' available on a particular MIME Type as well as an interface to retrieve an object that can operate on an object of a particular MIME Type (effectively a component registry). The Command Map can generate and maintain a list of available capabilities on a particular data type by a mechanism defined by the implementation of the particular instance of the CommandMap.

The JavaBeans™ package provides the programming model for the software components that implemented the commands. Each JavaBeans™ component can use externalization, or can implement the CommandObject interface to allow the typed data to be passed to it.

The JAF defines the CommandMap interface, which provides a flexible and extensible framework for the CommandMap. The CommandMap interface allows developers to develop their own solutions for discovering which commands are available on the system. A possible implementation can access the 'types registry' on the platform or use a server-based solution. The JAF provides a simple default solution based on RFC 1524 (.mailcap) like functionality.

Beans extend the CommandObject 76 interface in order to interact with JAF services. JAF-aware JavaBeans™ components can directly access their DataSource and DataHandler objects in order to retrieve the data type and to act on the data.

Using the JAF Framework

The 'canonical' consumer of the JAF framework accesses it through the DataHandler (although the major subsystems are designed to also operate independently). An underlying DataSource object is associated with the DataHandler when the DataHandler class is constructed. The DataHandler retrieves the data typing information from the DataSource or gets the data type directly from the constructor. Once this initialization step is complete, request a list of commands that can be performed on the data item can be accessed from the DataHandler.

When an application issues a request for this list, the DataHandler uses the MIME data type specifier returned, in order to request a list of available commands from the CommandMap object. The CommandMap has knowledge of available commands (implemented as Beans) and their supported data types. The CommandMap returns a subset of the full list of all commands based on the requested MIME type and the semantics of the CommandMap implementation, to the DataHandler.

Ultimately when the application wishes to apply a command to some data, it is accomplished through the appropriate DataHandler interface which uses the CommandMap to retrieve the appropriate Bean which is used to operate on the data. The container (user of the framework) makes the association between the data and the Bean.

JAF Usage Scenarios

This scenario uses the example of a hypothetical file viewer application in order to illustrate the normal flow of tasks involved when implementing the JAF. The file viewer is similar to CDE's 'dtfile,' or to the Windows 95 Explorer utility. When launched, it presents the user with a display of available files. It includes a function like CDE's dtfile or Explorer's 'right mouse' menu, where all operations that can be performed on a selected data item are listed in a popup menu for that item.

A typical user launches this application to view a directory of files. When the user specifies a file by clicking on it, the application displays a popup menu which lists the available operations on that file. File system viewer utilities normally include 'edit,' 'view,' and 'print' commands as available operations. For instance selecting 'view' causes the utility to open the selected file in a viewer which can display data of the data type held in that file.

Description of tasks performed by the application is broken down into three discrete steps, for clarity:

Initialization: The application constructs a view of the file system.

Getting the Command List: The application presents the command list for a selected data item.

Performing the Command: The application performs a command on the selected data object.

Initialization

One of the interfaces mentioned below is the 'DataSource' object. The DataSource object encapsulates the underlying data object in a class that abstracts the underlying data storage mechanism, and presents its consumers with a common data access and typing interface. The file viewer application queries the file system for its contents.

The viewer instantiates a DataSource object for each file in the directory. Then it instantiates a a DataHandler with the DataSource as its constructor argument. A DataHandler cannot be instantiated without a DataSource. The DataHandler object provides the client application with access to the CommandMap, which provides a service that enables access to commands that can operate on the data. The application maintains a list of the DataHandler objects, queries them for their names and icons to generate its display.

```
// for each file in the directory:
File file=new File(file_name);
DataSource ds=new FileDataSource(file);
DataHandler dh=new DataHandler(ds);
```

Getting the Command List

Once the application has been initialized and has presented a list of files to the user, the user can select a file on the list. When the user selects a file, the application displays a popup menu that lists the available operations on that file.

The application implements this functionality by requesting the list of available commands from the DataHandler object associated with a file. The DataHandler retrieves the MIME Type of the data from the DataSource object and queries the CommandMap for operations that are available on that type. The application interprets the list and presents it to the user on a popup menu. The user then selects one of the operations from that list.

```
// get the command list for an object
CommandInfo cmdInfo[ ] = dh.getPreferredCommands( );
PopupMenu popup = new PopupMenu("Item Menu");
// populate the popup with available commands
for(i = 0; i < cmdInfo.length; i++)
    popup.add(cmdInfo[i].getCommandName( ));
// add and show popup
```

```
-continued add(popup);
popup.show(x_pos, y_pos);
```

Performing a Command

After the user has selected a command from the popup menu, the application uses the appropriate CommandInfo class to retrieve the Bean that corresponds to the selected command, and associates the data with that Bean using the appropriate mechanism (DataHandler, Externalization etc.). Some CommandObjects (viewers for instance) are subclassed from java.awt.Component and require that they are given a parent container. Others (like a default print Command) might not present a user interface. This allows them to be flexible enough to function as stand alone viewer/editors, or perhaps as components in a compound document system. The 'application' is responsible for providing the proper environment (containment, life cycle, etc.) for the CommandObject to execute in.

```
// get the command object
Object cmdBean = cmdInfo[cmd_id].getCommandObject(dh,
                                              this.getClassLoader( ));
... // use serialization/externalization where appropriate
my_awt_container.add((Component)cmdBean);
```

An Alternative Scenario

The first scenario was the 'canonical' case. There are also circumstances where the application has already created objects to represent its data. In this case creating an in-memory instance of a DataSource that converted an existing object into an InputStream is an inefficient use of system resources and can result in a loss of data fidelity.

In these cases, the application can instantiate a DataHandler, using the DataHandler(Object obj, String mimeType) constructor. DataHandler implements the Transferable interface, so the consuming Bean can request representations other than InputStreams. The DataHandler also constructs a DataSource for consumers that request it. The DataContentHandler 78 mechanism is extended to also allow conversion from Objects to InputStreams.

The following code is an example of a data base front end using the JAF, which provides query results in terms of objects.

```
/**
 * Get the viewer to view my query results:
 */
```

-continued

```
Component getQueryViewer(QueryObject qo) throws Exception {
    String mime_type = qo.getType( );
    Object q_result = qo.getResultObject( );
    DataHandler my_dh = new DataHandler(q_result, mime_type);
    return (Component)my_dh.getCommand("view").getCommandObject(my_dh,
null));
}
```

JAF Framework Core Classes interface DataSource: The DataSource interface provides the JavaBeans™ Activation Framework with an abstraction of some arbitrary collection of data. It provides a type for that data as well as access to it in the form of InputStreams and OutputStreams where appropriate.

class DataHandler: The DataHandler class provides a consistent interface to data available in many different sources and formats. It manages simple stream to string conversions and related operations using DataContentHandlers. It provides access to commands that can operate on the data. The commands are found using a CommandMap.

interface DataContentHandler: The DataContentHandler interface is implemented by objects that can be used to extend the capabilities of the DataHandler's implementation of the Transferable interface. Through DataContentHandlers the framework can be extended to convert streams in to objects, and to write objects to streams.

interface DataContentHandlerFactory: This interface defines a factory for DataContentHandlers. An implementation of this interface should map a MIME type into an instance of DataContentHandler. The design pattern for classes implementing this interface is the same as for the ContentHandler mechanism used in java.net.URL.

class CommandMap: The CommandMap class provides an interface to the registry of viewer, editor, print, etc. objects available in the system. Developers are expected to either use the CommandMap implementation included with this package (MailcapCommandMap) or develop their own. Note that some of the methods in this class are abstract.

interface CommandObject: Beans that are Activation Framework aware implement this interface to find out which command verb they're being asked to perform, and to obtain the DataHandler representing the data they should operate on. Beans that don't implement this interface may be used as well. Such commands may obtain the data using the Externalizable interface, or using an application-specific method.

class CommandInfo: The CommandInfo class is used by CommandMap implementations to describe the results of command requests. It provides the requestor with both the verb requested, as well as an instance of the bean. There is also a method that will return the name of the class that implements the command but it is not guaranteed to return a valid value. The reason for this is to allow CommandMap implmentations that subclass CommandInfo to provide special behavior. For example a Framework Deliverables JAF Framework Auxiliary Classes class FileDataSource: The FileDataSource class implements a simple DataSource object that encapsulates a file. It provides data typing services via a FileTypeMap object.

class FileTypeMap: The FileTypeMap is an abstract class that provides a data typing interface for files. Implementations of this class will implement the getContentType methods which will derive a content type from a file name or a File object. FileTypeMaps could use any scheme to determine the data type, from examining the file extension of a file (like the MimetypesFileTypeMap) to opening the file and trying to derive its type from the contents of the file. The FileDataSource class uses the default FileTypeMap (a MimetypesFileTypeMap unless changed) to determine the content type of files.

class MimetypesFileTypeMap: This class extends FileTypeMap and provides data typing of files via their file extension. It uses the .mime.types format. class URLDataSource: The URLDataSource class provides an object that wraps a URL object in a DataSource interface. URLDataSource simplifies the handling of data described by URLs within the JavaBeans™ Activation Framework because this class can be used to create new DataHandlers.

class MailcapCommandMap: MailcapCommandMap extends the CommandMap abstract class. It implements a CommandMap whose configuration is based on mailcap files (RFC 1524). The MailcapCommandMap can be configured both programmatically and via configuration files.

class ActivationDataFlavor: The ActivationDataFlavor is a special subclass of java.awt.datatransfer.DataFlavor. It allows the JAF to set all three values stored by the DataFlavor class via a new constructor as well as improved MIME parsing in the equals method. Except for the improved parsing, its semantics are identical to that of the JDK's DataFlavor class.

class UnsupportedDataTypeException: Signals that requested operation does not support the requested data type.

class MimeType: A Multipurpose Internet Extension (MIME) type, as defined in RFC 2045 and 2046.

Small Footprint Device Application/Service Containment Framework

As described above, the bookmark service or another application/service running on a small footprint device, such as a personal contact list service, may invoke a separate service module to perform an action selected by a user for a particular data source. Since the system may open-ended, allowing various actions to be defined for various types of data sources, it may be necessary or desirable for the small footprint device software applications/services to be based on a modular, extendable, lightweight application/service containment framework. Such a containment framework is described below.

Figure 5:
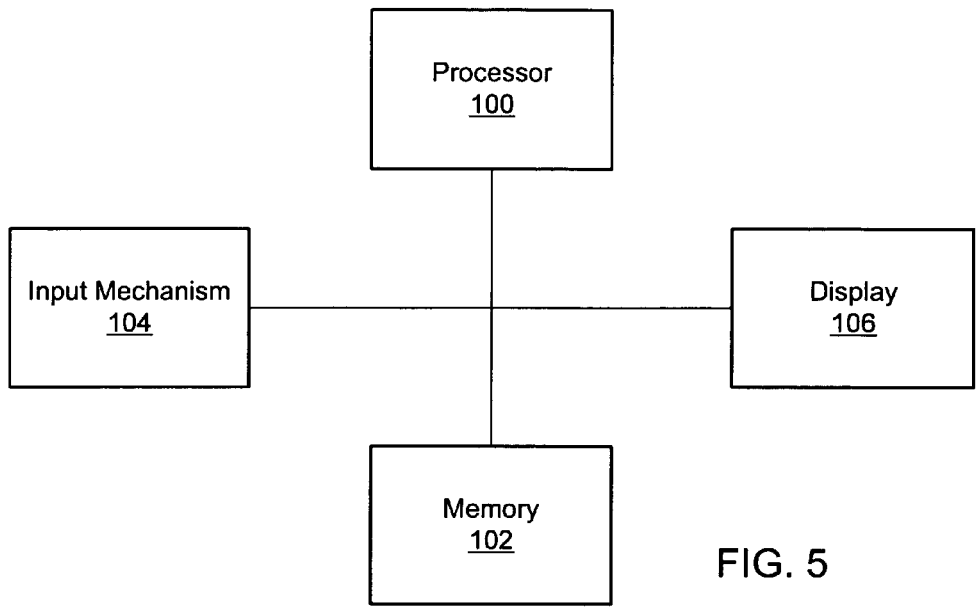
FIG. 5 is a block diagram illustrating the hardware architecture of a typical small footprint device.

FIG. 5—Hardware Architecture Block Diagram

FIG. 5 is a block diagram illustrating the hardware architecture of a typical small footprint device. As used herein, a small footprint device is a hardware device comprising computing resources such as a processor and a system memory, but having significantly greater constraints on one or more of these resources than a typical desktop computer has. For example, a small footprint device may have two megabytes of memory or less, whereas a typical desktop system may have 64 megabytes or more. Also a typical small footprint device may have significantly less processing power than a typical desktop computing system, either in terms of processor type, or processor speed, or both. For example, a personal data assistant device may have a 16 MHz processor, whereas a typical desktop system may have a processor speed of 100 MHz or higher. Also, a typical small footprint device may have a display size significantly smaller than the display screen of a desktop computing system. For example, the display screen of a handheld computer is typically small compared to the display screen of a desktop monitor.

It is noted that the specific numbers given are exemplary only and are used for comparison purposes. For example, a personal data assistant having eight megabytes of memory or more may still be a small footprint device, although the device has more memory than the typical figure of two megabytes given above.

Small footprint devices may also have constraints on other resource types compared to typical desktop computing systems, besides the memory, processor, and display size resources described above. For example, a typical small footprint device may not have a hard disk, may not have a network connection, or may have an intermittent network connection, or may have a wireless network connection, etc.

Many small footprint devices are portable and/or are small compared to desktop computers, but are not necessarily so. Also, many small footprint devices are primarily or exclusively battery-operated. Also, small footprint devices may typically have a more limited or narrow range of usage possibilities than a typical desktop computing system. Small footprint devices include, but are not limited to, the following examples: handheld computers, wearable devices (e.g., wristwatch computers), personal data assistants (PDAs), "smart" cellular telephones, set-top boxes, game consoles, global positioning system (GPS) units, electronic textbook devices, etc. Since new classes of consumer devices are rapidly emerging, it is not possible to provide an exhaustive list of small footprint devices. However, the term "small footprint device" is intended to include such devices as may reasonably be included within the spirit and scope of the term as described above.

FIG. 5 illustrates a block diagram of a typical small footprint device. It is noted that the small footprint device may have various different architectures, as desired. The hardware elements not necessary to understand the operation of the present invention have been omitted for simplicity.

As shown in FIG. 5, the small footprint device contains a processor 100. The processor 100 may be any of various types, including an x86 processor, e.g., a Pentium class, a PowerPC processor, as well as other less powerful processors or processors developed specifically for small footprint devices. The processor 100 may have various clock speeds, including clock speeds similar to those found in desktop computer-class processors, as well as lower speeds such as 16 MHz.

Also shown in FIG. 5 the device includes a system memory 102. The system memory 102 may comprise memory of various types including RAM or ROM. A typical small footprint device may have a very small memory storage capacity compared to a typical desktop computer system.

A small footprint device may also comprise one or more input mechanisms. An input mechanism 104 is illustrated in FIG. 5. The input mechanism 104 may be any of various types, as appropriate to a particular device. For example, the input mechanism may be a keypad, mouse, trackball, touch pen, microphone, etc.

A small footprint device may also comprise one or more display mechanisms. A display 106 is illustrated in FIG. 5. However, a small footprint device may not comprise a display, or may comprise another type of output mechanism, such as an audio speaker. The display mechanism 106 may be any of various types, as appropriate to a particular device. The display mechanism for a typical small footprint device, such as a smart cellular phone, may be small compared to the display of a desktop computer system.

Figure 6:
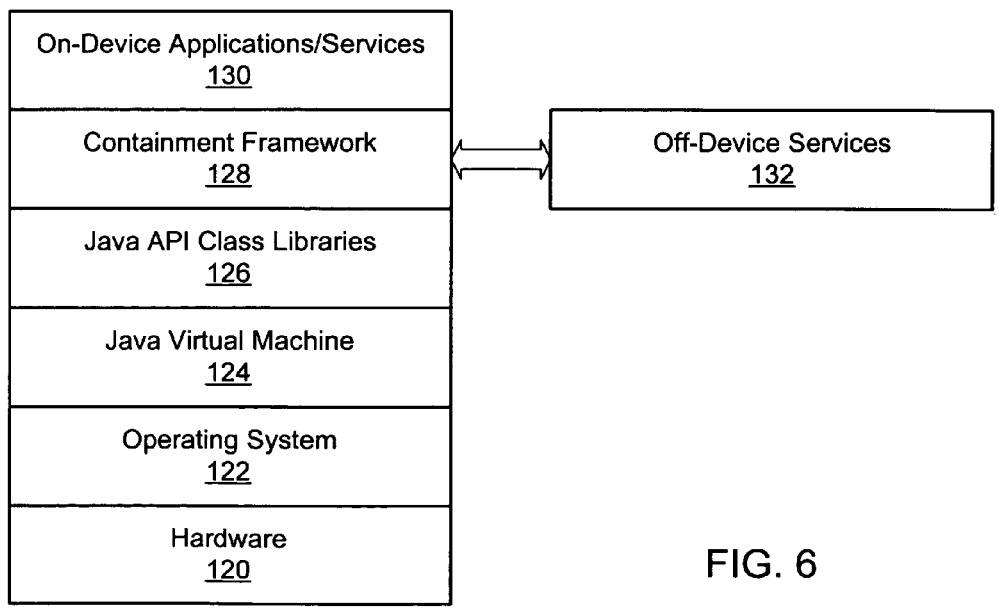
FIG. 6 illustrates a typical hierarchy of hardware/software layers involved in a system running applications and services within the containment framework.

FIG. 6—Hardware/Software Hierarchy Diagram

FIG. 6 illustrates a typical hierarchy of hardware/software layers involved in a system running applications and services within the containment framework. The drawing is exemplary, and various layers may be added, combined, or omitted as appropriate for a particular device or implementation.

The base layer shown in FIG. 6 is the device hardware layer 120, which comprises the hardware resources necessary to support a software system, such as a processor and system memory. In one embodiment, the hardware of a small footprint device, such as the small footprint device hardware example illustrated in FIG. 5, implements the hardware layer 120 illustrated in FIG. 6. However, in other embodiments, the hardware layer 120 may be implemented in other types of devices, such a device with even greater resource constraints than a typical small footprint device, such as a smart card.

As shown in FIG. 6, the next layer up from the hardware layer is the operating system layer 122. As is well known in the art, the operating system functions as an interface layer between the device hardware and software running on the device and serves as a manager for low-level tasks such as input/output, memory management, etc. The operating system 122 illustrated in FIG. 6 may be any particular operating system which supports the higher layers shown in FIG. 6. The operating system 122 may be a small and efficient one that is suitable for or written particularly for use in a small footprint device. For example, the operating system 122 may be the JavaOS operating system available from Sun Microsystems, Inc.

In one embodiment, the containment framework is implemented in a Java™ application environment as one or more Java™ classes. As shown in FIG. 6, the Java™ virtual machine layer 124 and Java™ application programming interface (API) class libraries layer 126 are the next layers up from the operating system. These two layers together make up the Java™ application environment, or Java™ platform. Classes implementing the containment framework may be built using the Java™ libraries 126 and compiled into bytecodes. The bytecodes are instructions which execute on the Java™ virtual machine 124, which interacts with the operating system 122 and/or the device hardware 120.

In one embodiment, the containment framework is implemented in the PersonalJava Java™ application environment, which is a Java™ platform designed to be highly scalable, modular, and configurable, while requiring minimal system resources. PersonalJava™ comprises the Java™ virtual machine and a subset of the Java™ API, including core and optional APIs and class libraries. In addition, the Personal-Java™ API includes specific features required by consumer applications in resource-limited environments, such as a specialized version of the Java™ abstract window toolkit (AWT). The PersonalJava™ AWT library is targeted and tuned for consumer product look and feel, providing graphics and windowing features while supporting low-resolution displays and alternate input devices (via an extended event model for mouse- and keyboard-less devices).

Referring again to FIG. 6, the containment framework 128 is shown as the next layer up from the Java™ platform layer. As noted above, the containment framework 128 may also be based on other platforms. As described in detail below, the containment framework 128 manages program modules, e.g. by enabling module registration, lookup, instance tracking, etc. Modules may provide various services. The containment framework 128 enables modules to request other modules, in order to use their services. Applications may be implemented as modules that utilize the services of other modules. The containment framework 128 thus provides a lightweight, extendable service and application framework, enabling applications to coexist and share a modular code base.

This type of extendable architecture enabling multiple program modules to cooperate is an important development for small footprint devices. Small footprint devices have historically been limited to relatively narrow uses. For example, cellular phones were typically used for telephony and little else. However, as various technologies are developed allowing small footprint devices to become "smarter", having general-purpose processors, larger display screens, etc., it has become desirable to expand the scope of applications used in small footprint devices.

The present containment framework may enable the types of applications and services generally associated with desktop computing environments to work together in a small footprint device, in a manner that desktop computer users are familiar with. As illustrated in FIG. 6 and described above, services and applications 130 running on a small footprint device may be implemented as modules built on the containment framework layer 128. For example, the Personal Applications suite available from Sun Microsystems, Inc. is built using one embodiment of the containment framework 128. The Personal Applications Suite comprises an integrated set of applications such as a browser, an email client, and a personal organizer.

FIG. 6 also illustrates the ability of some embodiments of the containment framework 128 to integrate off-device services 132 with on-device applications/services 130. For example, the containment framework 128 may provide an interface between a small footprint device and a network such as a Jini network. A small footprint device system may register its services for use by other devices or clients in a network. The containment framework may also enable services and applications within the small footrpint device to look up and use services provided by other network devices. The integration of services of the small footprint device with network services is discussed in more detail below for FIG. 7.

FIGS. 7–11: Exemplary Network Device and Service Federation

Figure 7:
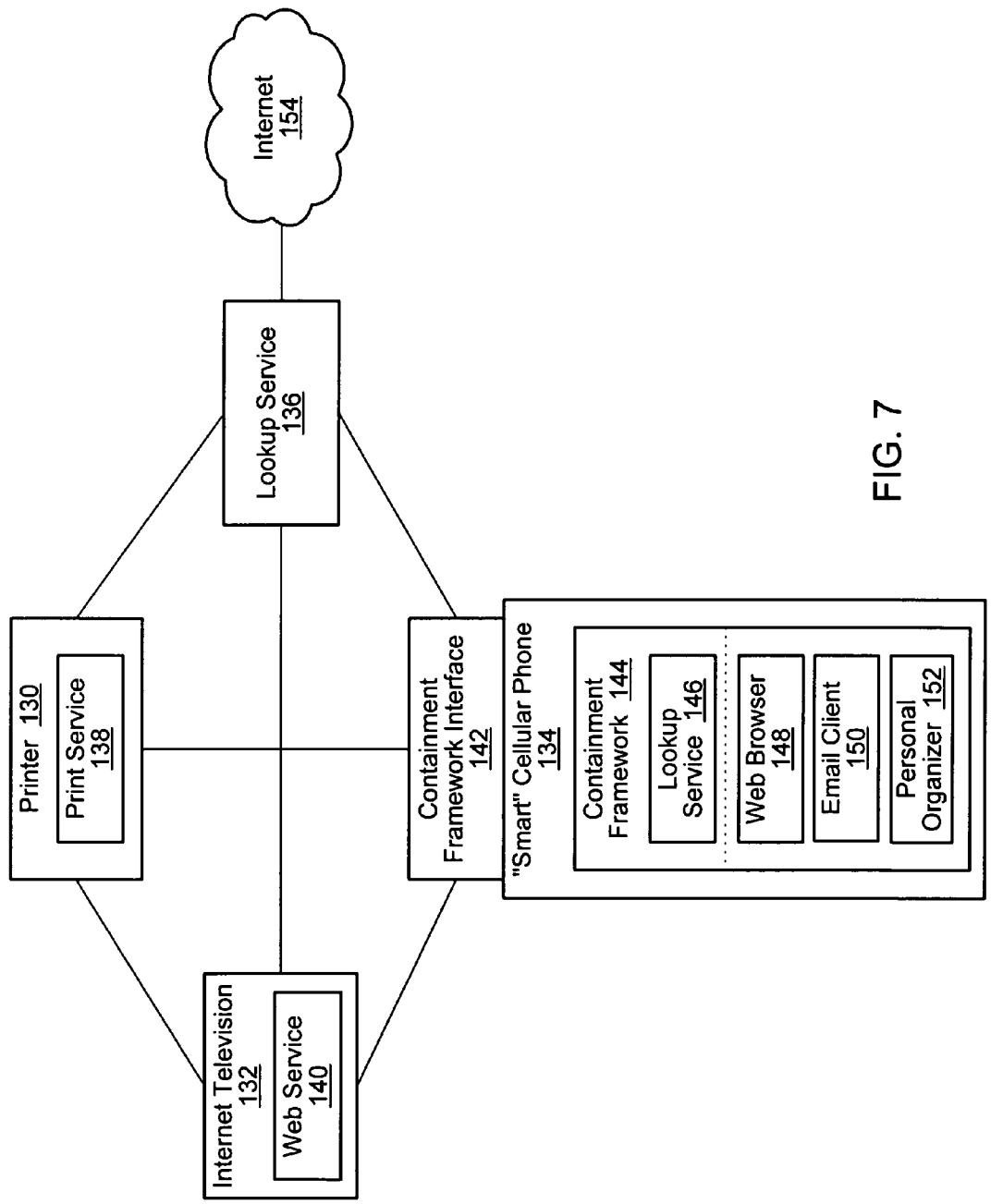
FIG. 7 illustrates an exemplary network in which a small footprint device running applications/services in the containment framework is connected to a local service-based network.

FIG. 7 illustrates an exemplary network in which a small footprint device running applications/services in the containment framework is connected to a local service-based network. In the example shown, a smart cellular phone 134 utilizing the containment framework 144 is connected to the network. Also shown attached to the network are a printer 130 and an internet-enabled television 132. In this example, it is assumed that the printer 130 and television 132 devices are operable to export services to a network and possibly use the services of other devices on the network. For example, the printer may export its print service 138, and the internet television may look up the print service and use it to print a web page. To facilitate the federation of devices and services in this manner, a lookup service 136 is located on the network. The lookup service 136 may reside on a separate device such as a network server.

The federation of devices and services may be implemented in various ways. For example, Jini™ technology, available from Sun Microsystems, Inc., comprises components and a programming model which enables the type of distributed system illustrated in FIG. 7. In one embodiment, the local network shown in FIG. 7 may be a Jini™ network, and the printer 130 and internet television 132 may be Jini™-enabled devices. Each device is operable to find the Jini™ network lookup service and register the services it offers with the lookup service. The lookup service maps interfaces indicating the functionality provided by a service to sets of objects that implement the service.

Figure 8:
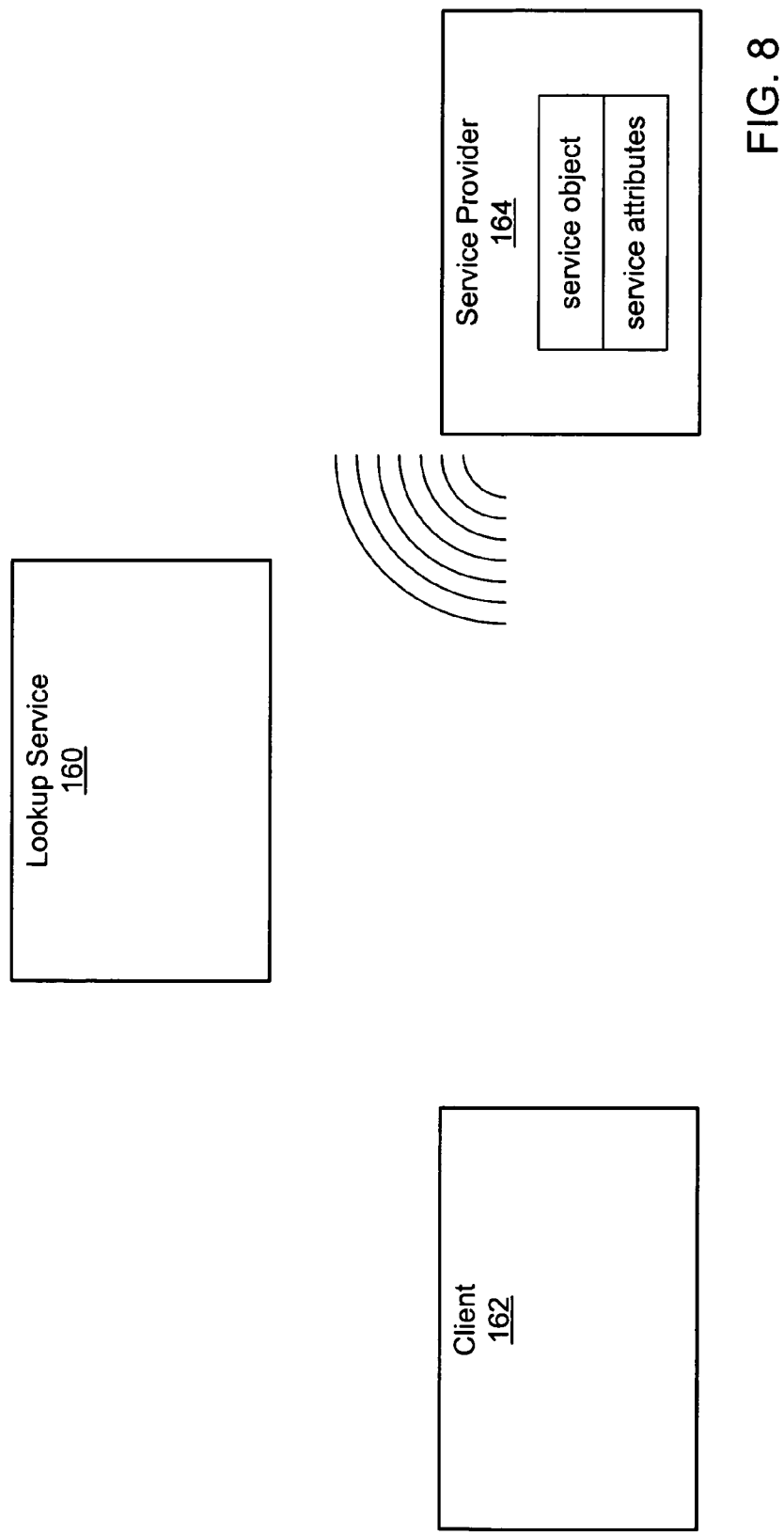
FIG. 8 illustrates the discovery process, in which a service provider finds a lookup service.

To add its services to a service federation, a device or other service provider may first locate an appropriate lookup service by using a "discovery" protocol. FIG. 8 illustrates the discovery process. As shown, the service provider 164, e.g. the printer 130 shown in FIG. 7, may broadcast a request on the local network for any lookup services to identify themselves.

Figure 9:
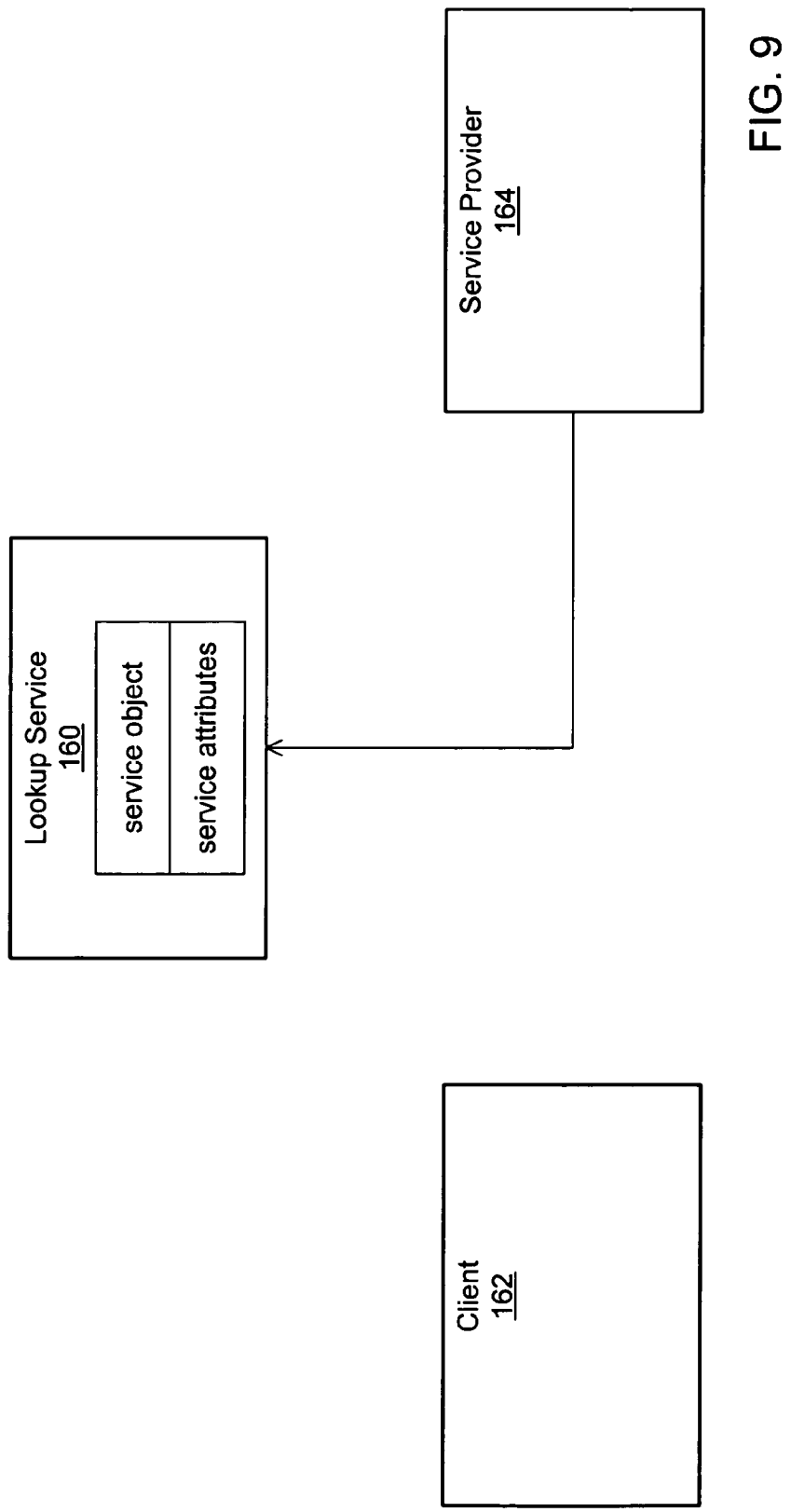
FIG. 9 illustrates the join process, in which a service provider registers its service with a lookup service.

Once the service provider 164 has located the lookup service 160, the service provider 164 may register its service with the lookup service 160 by using a "join" protocol. FIG. 9 illustrates the join process. The service provider 164 may create a service object which clients can use to invoke the service. As illustrated in FIG. 9, the service object for the provided services may then be loaded into the lookup service 160, along with service attributes or descriptors containing information about the types or names of services provided. For example, in a Jini™ network, the printer 130 shown in FIG. 7 may create a service object which comprises a Java™ programming interface for the print service 138. The printer 130 may then call a "register" method of the lookup service 136, passing this service object, along with attributes which specify that the service 138 being registered is a print service, the printing resolution, the possible paper sizes, etc.

Figure 10:
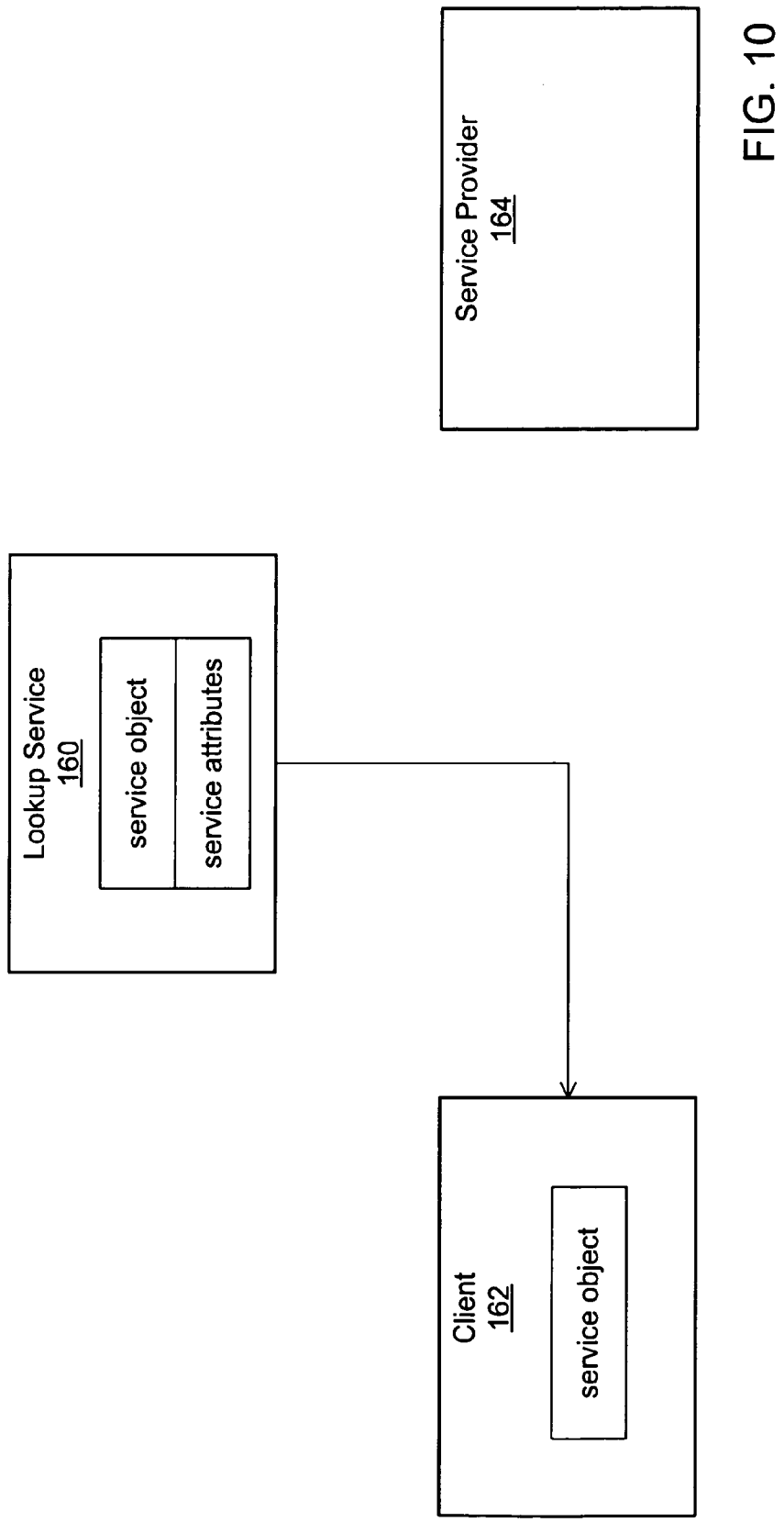
FIG. 10 illustrates the lookup process, in which a client requests a service from a lookup service.

Once the service provider 164 has joined its services with the lookup service 160, other network clients may request and use the services. The process of requesting a service, called lookup, is illustrated in FIG. 10. After discovering the lookup service, a client 162 may request a service from the lookup service 160 using a description of the requested service. The lookup service 160 attempts to match the description given by the requestor to the services that have joined the lookup service. The lookup service 160 may use the service attributes sent by the service provider 164 during the join process to perform this matching. If a match is found, the lookup service 160 provides the appropriate service object to the client 162. For example, a Java™ interface for the requested service may be provided to the client 162.

Figure 11:
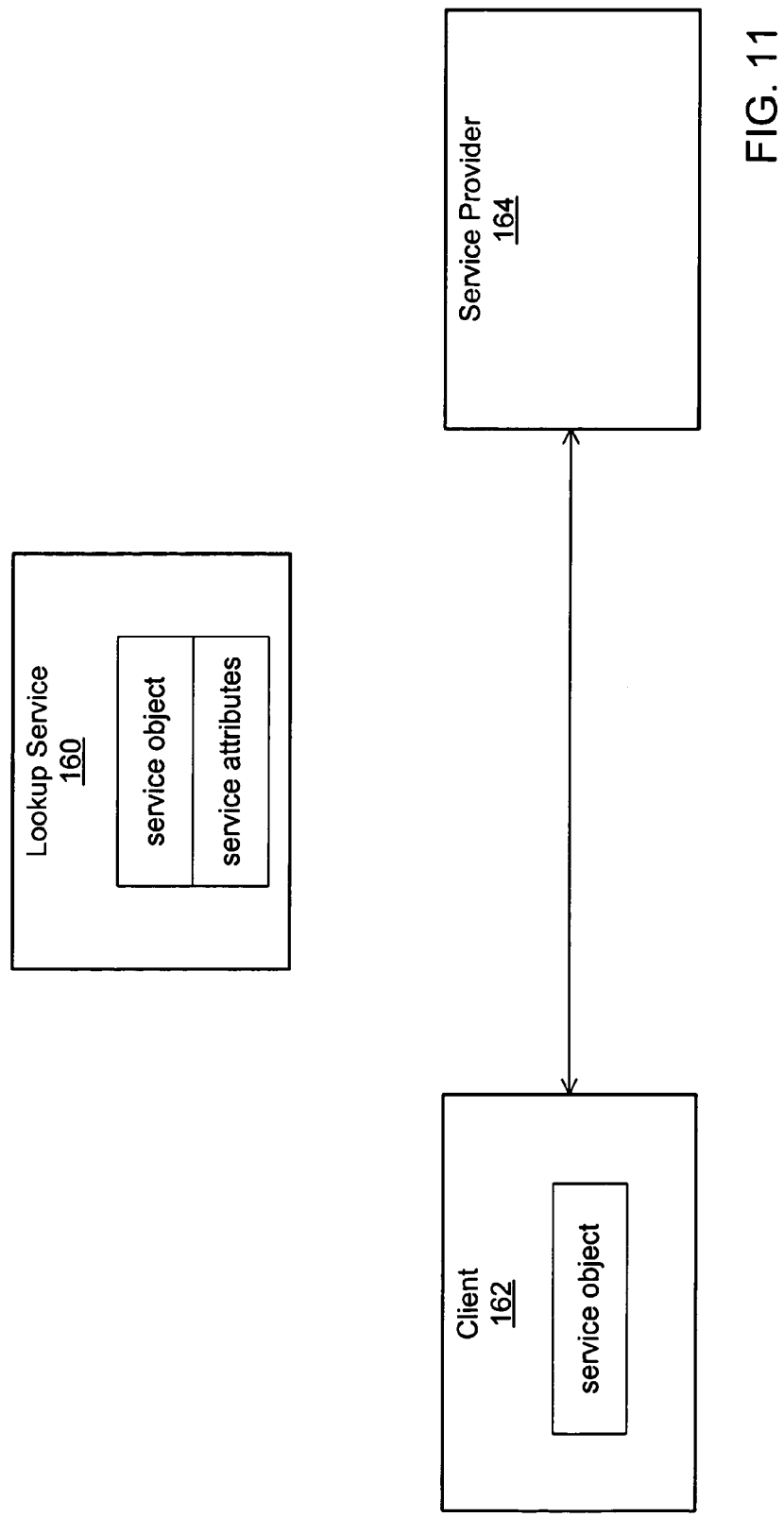
FIG. 11 illustrates the service invocation process, in which a client invokes a service using a service object received from a lookup service.

Once a client 162 has received a service object from the lookup service, the client may invoke the service. FIG. 11 illustrates the process of service invocation. When a service is invoked, the client 162 and the service provider 164 may communicate directly with each other. Any of various interaction protocols may be used for this communication. For example, the protocol used may be Java™ Remote Method Invocation (RMI), CORBA, DCOM, etc. The service object that a client receives from the lookup service may call back to code located at the service provider, e.g. by calling an RMI method, or it may execute locally to provide the requested service, or it may use a combination of these approaches.

As shown in FIG. 7, the lookup service 136 for a local network may also act as a gateway to an outside network such as the Internet 154. The service-based distributed computing model may thus be extended to include clients and services located outside the local network. For example, the technology being developed for the Open Service Gateway Initiative (OSGI) may be leveraged to implement this type of distributed computing system.

This type of service sharing between and across different networks and the Internet may enable new types of applications to be developed. For example, merchants may use Internet services to record data about specific consumers, and advertising service providers may use this data to push context-specific ads onto consumer devices, depending on which local network the device is connected to, etc. For example, a customer may enter a shopping mall and connect a personal data assistant (PDA) into a local network for the shopping mall, via a wireless connection. An Internet-based consumer data service may be joined with the lookup service for the shopping mall network and may provide information about the specific consumer who has just plugged into the mall network. Services running in the shopping mall network may then use this data together with other factors such as the customer's current location within the mall, the time of day, etc., in order to generate personalized ads and push them onto the customer's PDA.

Many other examples of services based on the network of FIG. 7 are possible. For example: network-enabled consumer devices within a home may utilize a service provided by a power company, via the Internet, which manages power consumption within the home; security service providers may monitor a home or specific devices via network services and may notify the owner immediately when property is broken into; health service providers may remotely monitor a patient's state by communicating with medical instruments; etc.

In the examples listed above, an assumption is made that devices are able to transparently connect to a network, integrate network services with device-resident services, and export device-resident services for use by network clients. The containment framework described herein may provide the necessary interface to integrate services and applications of small footprint devices such as personal data assistants, handheld computers, smart cellular phones, etc. with a network service federation.

As shown in FIG. 7 and described in more detail below, the containment framework 144 has its own type of lookup service 146. The lookup service 146 within the containment framework 144 may operate similarly to the local network lookup service described above, utilizing discovery, join, lookup, and service invocation processes. For example, the personal organizer application 152 may utilize various services such as a calendar service, a contact list service, a bookmark service, etc. (not shown). The personal organizer application 152 may obtain a reference for communicating with these services via the containment framework lookup service 146.

The containment framework 144 may integrate its own lookup service 146 with an off-device lookup service such as the local network lookup service 136 shown in FIG. 7. In this way, off-device services such as the print service 138 and the web service 140 may become available to the applications/services 148, 150, and 152 of the containment framework, and vice versa. For example, the personal organizer application 152 may request a print service from the containment framework lookup service 146. The containment framework lookup service 146 may first search for an on-device print service. If one is not found, the containment framework lookup service 146 may then request a print service from the network lookup service 136. The service object for the print service 138 may then be returned to the personal organizer 152. An interface 142 between the on-device services/applications and the off-device services is illustrated in FIG. 7. Details follow on how the integration of on-device/off-device services may be implemented.

As noted above, clients of services may themselves be services to other clients. For example, the email client "application" 150 of the smart cellular phone shown in FIG. 7 may itself be a service to a client running in the containment framework 144 or to a network client. For example, in the case of malfunction, the printer 130 shown in FIG. 7 may request an email service so that it can send diagnostic information to a service technician. If the network lookup service 136 cannot find a network-based email service, it may request an email service from the smart cellular phone 134 via the interface 142. A service object for the email application/service 150 running in the containment framework 144 may be passed to the requesting printer client 130. In this example, the printer client 130 may communicate directly with the email application/service 150 to send an email containing diagnostic information to a printer service technician. The email application/service 150 may send the email immediately if it is able to find an email server service, or it may send the email later when such a service becomes available when the cellular phone user connects to a different network.

Although the above description references specific protocols and programming models, such as Jini™ technology, it is noted that these specific technologies are exemplary only. For example, the applications and services within the containment framework may be integrated with clients, services, devices, networks, etc. which employ any of various types of standards, protocols, and programming models, including, but not limited to: Jini™, CORBA, COM/DCOM, Bluetooth, CAL, CEBus, HAVi, Home API, HomePNA, HomePnP, HomeRF, VESA, etc.

Figure 12:
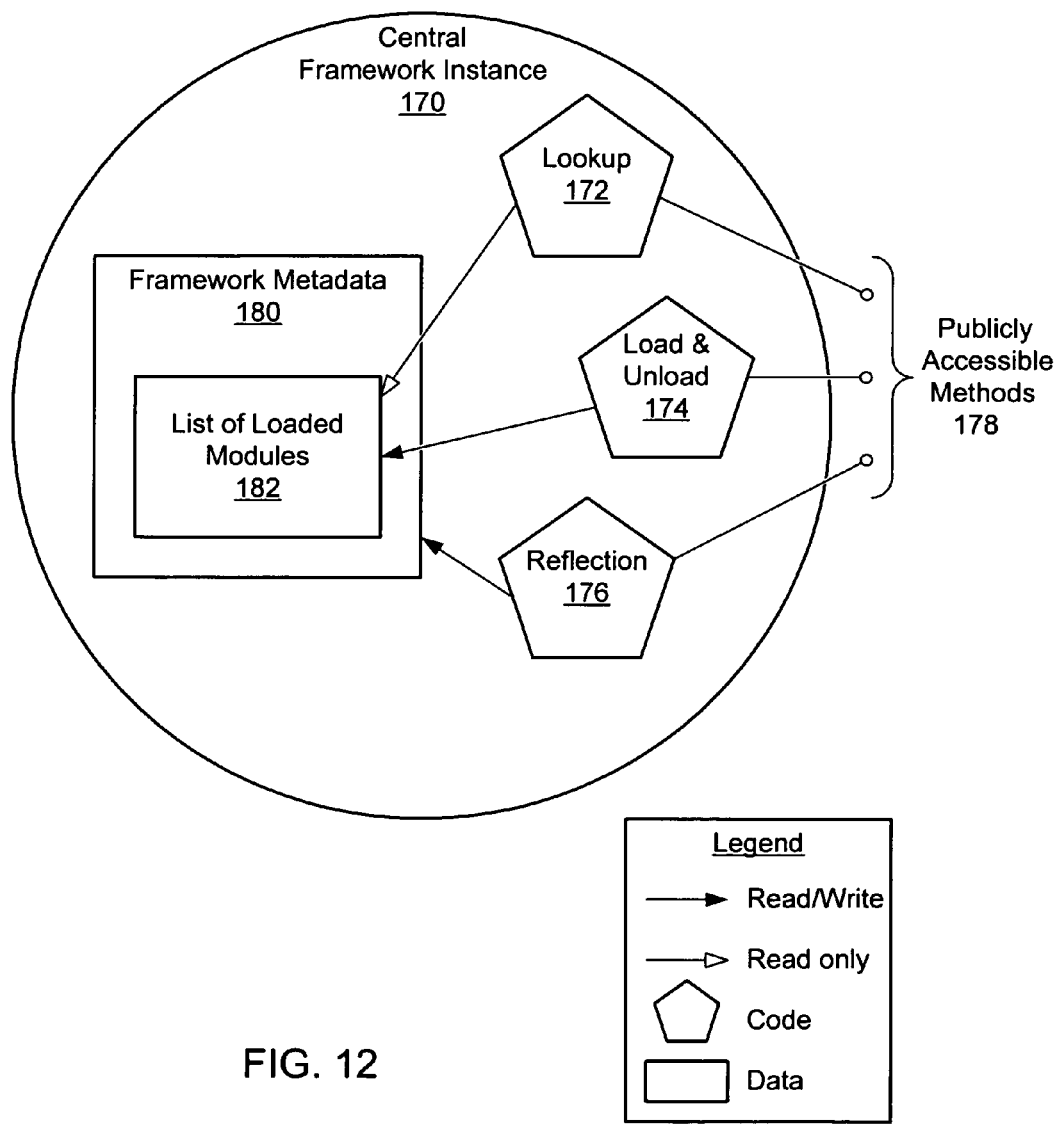
FIG. 12 is an abstract block diagram illustrating the basic architecture of the containment framework.

FIG. 12—Containment Framework Block Diagram

FIG. 12 is an abstract block diagram illustrating the basic architecture of the containment framework environment. As described above, the containment framework provides a containment system for applications and services. These applications and services are managed within the system as units called modules. The containment framework is lightweight; in one embodiment, modules may interact with a single framework manager object which performs all module management. This manager is referred to herein as the central framework instance. In one embodiment, the central framework instance may be implemented as an instance of a Java™ class. FIG. 12 illustrates the central framework instance 170 and the code and data it comprises/manages. It is noted that FIG. 12 illustrates one embodiment of the containment framework. Other embodiments may employ a different architecture and/or may be implemented in different programming languages or software environments. For example, the module management/containment performed by the central framework instance 170 illustrated in FIG. 12 may be performed by multiple objects or components in other embodiments.

As shown in FIG. 12, the central framework instance 170 comprises data 182 representing the modules currently loaded in the system. The containment framework architecture is non-hierarchical. Thus, the loaded modules may be represented as a flat list or array of modules. This non-hierarchical system helps to keep the core containment framework code and the modules running within the framework compact. Systems employing hierarchical components such as JavaBeans™ components may provide associated benefits, but the benefits come at the expense of a more complex management system requiring more system resources. However, the containment framework does provide a mechanism for the non-hierarchical modules to gain many of the benefits of a hierarchical containment system. This mechanism is described below for FIGS. 13 and 14.

As shown in FIG. 12, in one embodiment the central framework instance 170 comprises publicly accessible methods 178 which modules may call. These methods may be broken into abstract groups. For example, one group of methods 172 may comprise lookup methods. Lookup methods implement the lookup service functionality described above. Modules may pass a module descriptor to a lookup method of the central framework instance 170 to locate a particular service module. The containment framework lookup process is described below for FIG. 16. Another group of framework methods 174 may comprise methods for loading and unloading modules. After finding a service module, a client module may request the central framework instance 170 to load the service module and return a reference to the loaded module. The client module may then invoke the service. The client may call a framework method to release the service module when it is finished using it. Although described as distinct groups, the division of methods into lookup and load/unload groups may be only a conceptual division. For example, in one embodiment a lookup method may also load a module that it matches and return a reference to the matched module.

FIG. 12 also illustrates system data 180 referred to as framework metadata, which may comprise data 182 describing the list of loaded modules and other data describing the state of the system. Another abstract group of methods 176 of the central framework instance 170 may comprise reflection methods. Reflection methods are somewhat different than the other groups of methods since they provide direct access to the core metadata 180. A special class of modules called system modules may call reflection methods to gain access to the metadata 180. Regular modules may not access the metadata 180.

After receiving a reference to the core system data 180, a system module may use or modify the data in any way desirable. Thus, the containment framework is highly extendable. The central framework instance 170 may itself remain small, and system modules may be added to implement any functionality not already enabled by the central framework instance 170. For example, a system module may enable the integration described above for FIGS. 7–11 between applications/services running within the containment framework and services based in an external network.

In this example, such a system module may be written as a secondary lookup service that conforms to the protocols and programming model of the external network. For example, for a Jini™ network, a system module may be written which discovers the Jini™ network lookup service and joins the network lookup service, registering itself as a secondary lookup service. When a network client requests a service, the network lookup service may invoke the lookup service implemented by the system module. This system module may attempt to find a service module within the containment framework which matches the description of the requested service. If a match is found, then the system module may perform any necessary steps to export the service module to the network client, since the system module has full access to the system module list and metadata. For example, the system module may load and register the matched service module into the system and return an interface, such as a Java™ interface, to the newly loaded module to the requester.

Figure 13:
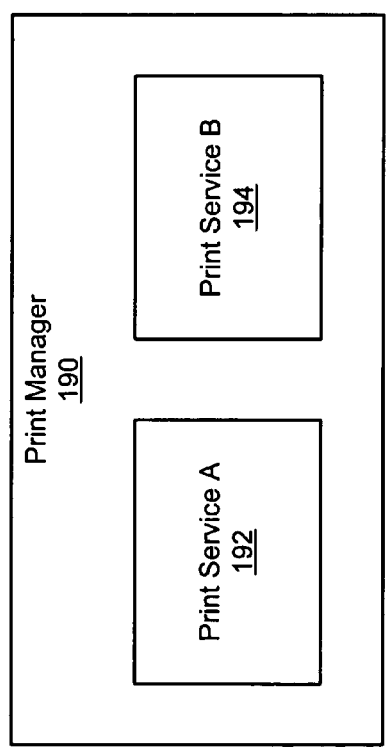
FIGS. 13 and 14 illustrate the use of module request listeners in the containment framework to simulate a hierarchical containment environment.
Figure 14:
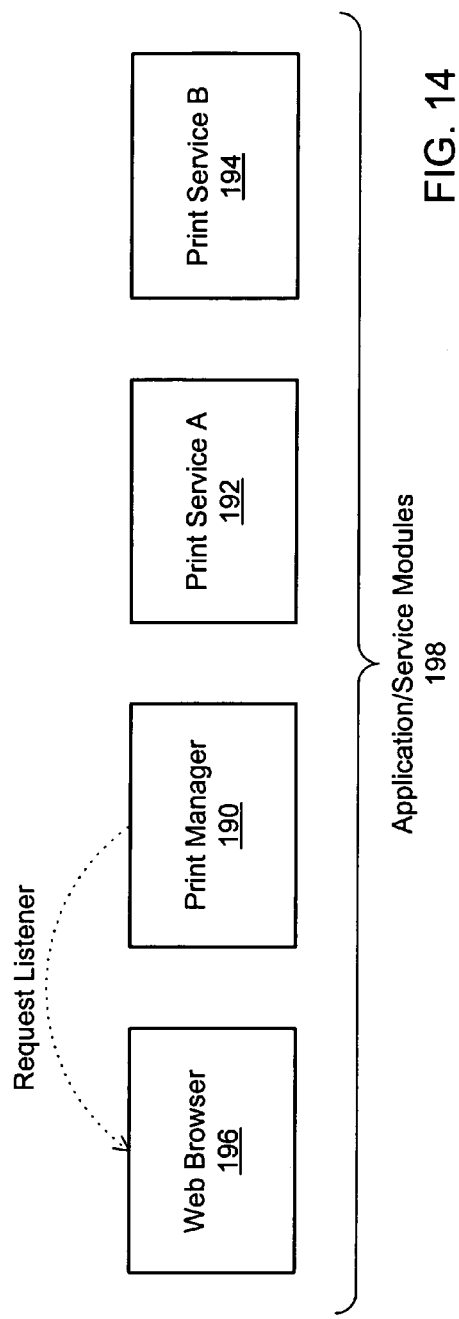

FIGS. 13 and 14—Simulating a Hierarchical Environment

It is often desirable to establish a hierarchical context for modules. For example, several service modules of the same type may be present in a system, but each may behave slightly differently. In a hierarchical containment system, a request by a module for a service may be filtered through a parent or containing module of the requesting module so that a reference to a specific service module may be passed back to the requestor. Hierarchical containment also has other inherent advantages, such as an ability to easily distribute and store data among a hierarchy of modules. However, as stated above, a full implementation of a hierarchical containment system may be very costly in terms of the system resources required, such as memory and processing power. The containment framework may provide a mechanism giving developers and applications many of the benefits of hierarchical containment, but without the high overhead costs usually associated with it.

For example, one embodiment of the containment framework allows modules to register themselves as module request listeners of other modules. For example, a module A may register itself as a request listener of a module B, e.g., by calling an AddRequestListener method of the central framework instance. When module B subsequently calls a method of the central framework instance to find a particular service, the central framework instance checks for any module request listeners for module B. In this case, it finds module A as a request listener, and asks module A to provide the requested service module to module B.

FIGS. 13 and 14 illustrate an exemplary use of module request listeners in the containment framework. FIG. 13 illustrates a desired conceptual module hierarchy for print services. As shown in the figure, two print service modules 192 and 194, print service A and print service B, are encapsulated in a print manager module 190. For example, the two print services 192 and 194 may print to different locations, have different resolution and color capabilities, etc. Either of these print service modules may satisfy a lookup request made by another module for a print service. However, it may be desirable to employ a print manager module which selects and returns a particular print service. For example the print manager 190 may select a print service based on which client module makes the print request, or the print manager may display a dialog box asking for user input for the desired print service characteristics.

Although the containment framework utilizes a non-hierarchical containment model, the hierarchy illustrated in FIG. 13 may be realized by registering the print manager module 190 as a module request listener of client modules that may request a print service. FIG. 14 illustrates example modules 198 which may run in a system. As described earlier, these modules may themselves employ other modules as services. According to the non-hierarchical model of the containment framework, the modules are shown arranged in a flat layout, with no inherent module hierarchy.

In this example, the web browser module 196 may be operable to make a print request, e.g., for printing a web page. As shown in FIG. 14, the print manager module 190 may be registered as a module request listener for the web browser module 196. Upon receiving the print service request from the web browser 196, the containment framework lookup service may find the print manager module 190 registered as a request listener for the web browser module 196 and may ask the print manager module 190 to provide a print service module to the web browser requestor 196. The print manager module 190 may then return a reference to print service module A 192 or print service module B 194, or the print manager module 190 may present a dialog box to the user to decide which print service module to return, etc. Thus, the desired module hierarchy of FIG. 13 may be implemented for non-hierarchical modules of the containment framework.

Figure 15:
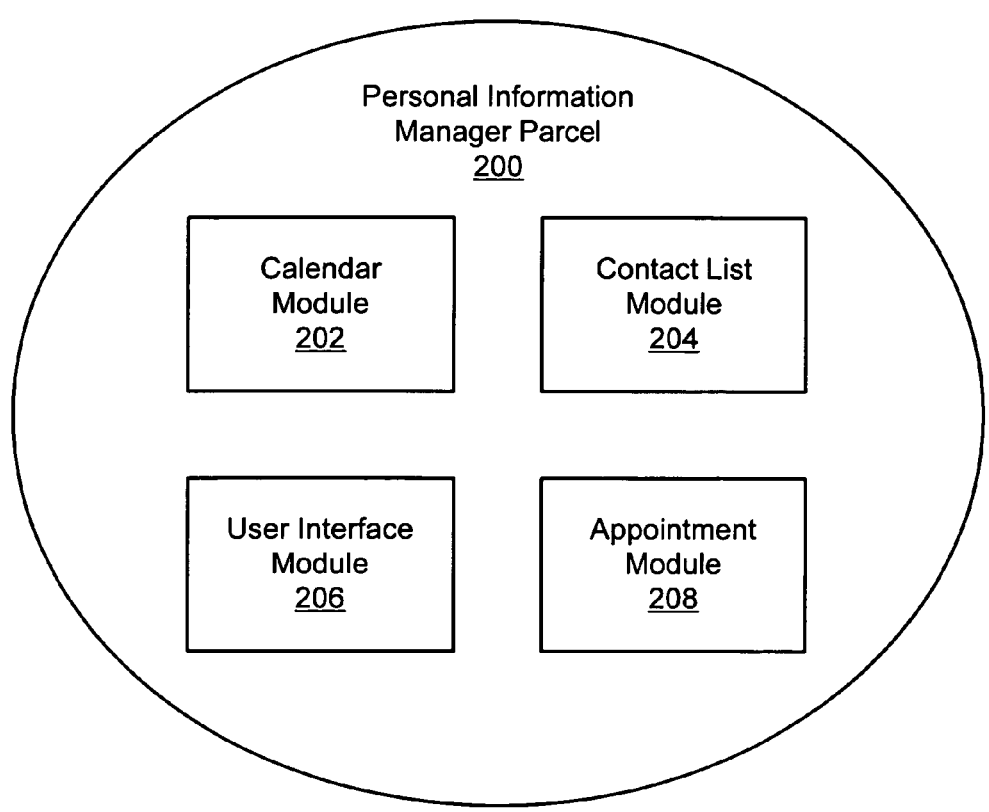
FIG. 15 illustrates the use of parcels to group modules together.

FIG. 15—Parcel Packaging Units

Modules may be packaged into units referred to as parcels. This packaging serves several purposes. For example, parcels provide a convenient mechanism to manage related code and data as a unit. If closely related modules have static dependencies, then they may be packaged together into a parcel. Parcels may be used to handle installation and upgrading within a system.

FIG. 15 illustrates an example parcel 200 that groups together modules related to a personal information manager (PIM). The figure shows a calendar module 202, a contact list module 204, an appointment module 208, and a user interface module 206. Various other modules may be present in the parcel as desired. The modules of the PIM parcel 200 may also make use of various core service modules running within the containment framework, such as bookmark services, find services, etc. The use of a PIM parcel may simplify installation and upgrading of a PIM application. Packaging the PIM modules into a parcel in this way also has the development-time benefit of creating separate code units for multi-target development.

Parcels also provide an additional way to provide a run-time context for non-hierarchical modules. When a module is loaded into the system, the central framework instance may store metadata specifying which parcel, if any, the module belongs to. Service modules may later use this information to provide services differently for different client modules, depending on which parcel the client belongs to. For example, client modules may use a file access service module to obtain a root directory. The file access module may return different root directories for different clients, depending on which parcels the clients belong to.

Figure 16:
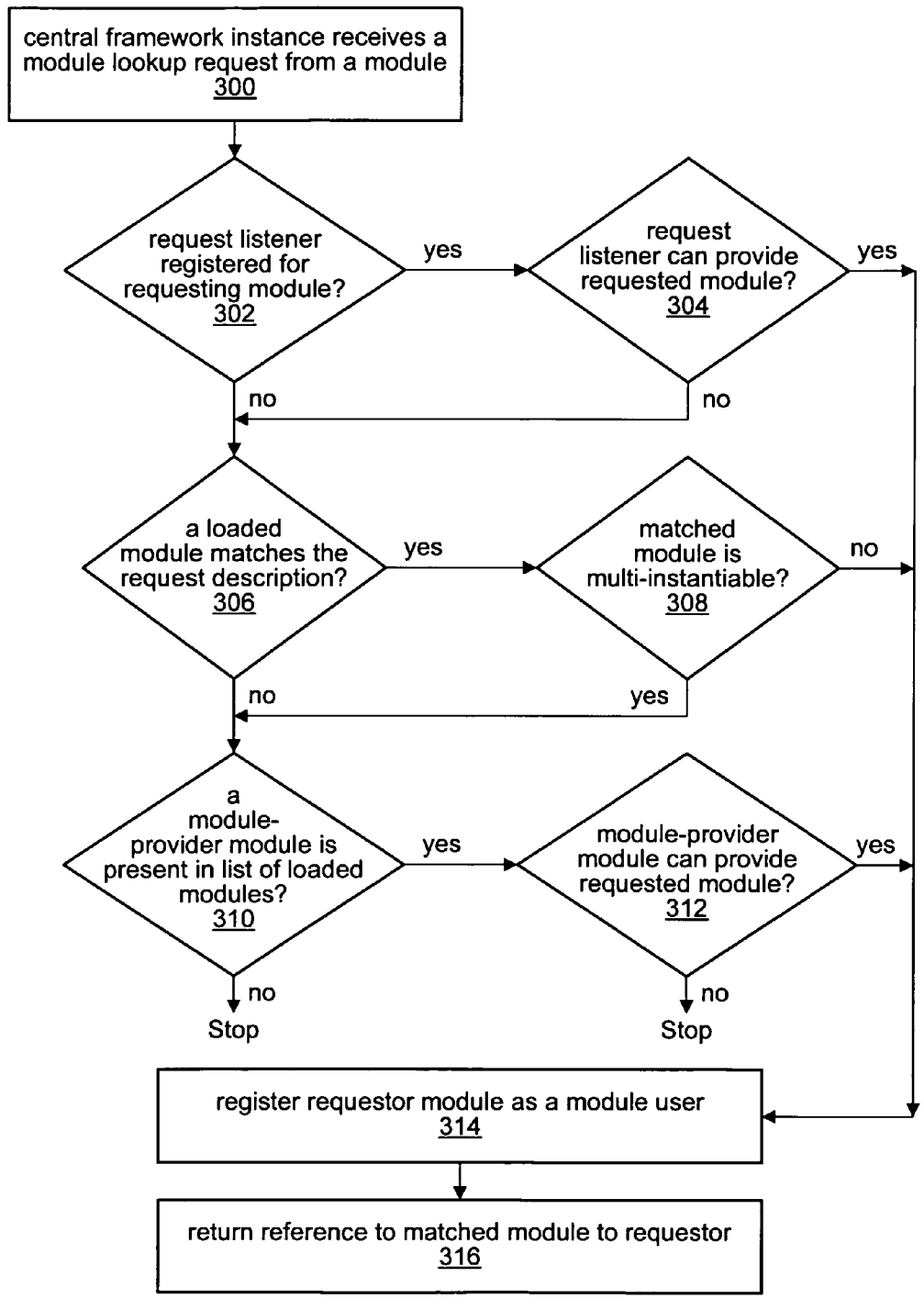
FIG. 16 is a flowchart diagram illustrating a typical lookup process that the central framework instance may perform when it receives a lookup request for a service module from a client module.

FIG. 16—Module Request Flowchart Diagram

FIG. 16 is a flowchart diagram illustrating a typical lookup process that the central framework instance may perform when it receives a lookup request for a service module from a client module. It is noted that FIG. 16 is exemplary and that various steps may be combined, omitted, or modified. For example, as noted previously, system modules may be added which customize the lookup process.

In step 300 of FIG. 16, the central framework instance receives a module lookup request from a requester module. For example, the requestor module may call a RequestModule method of the central framework instance, passing a module descriptor for the service module being requested, as well as a reference to the requestor module itself. The reference to the requestor module may be added to the system data so to keep track of service module users. As described in more detail below, a module may be unloaded when no other modules are using it.

The module descriptor passed by the requestor module specifies various attributes about the requested module that the framework instance can use to attempt to find a matching module. This module descriptor may be an object which comprises information such as the requested module's service type, class name, and/or service-specific attributes, etc. The requestor may also pass a text description to the central framework instance, which the central framework instance may use to create a module descriptor object.

In step 302, the central framework instance checks to see whether any request listener modules are registered for the requesting module. If a request listener is found, then in step 304 the framework instance notifies the request listener of the request and instructs the request listener to attempt to provide a module which matches the module request descriptor. If the request listener can provide a matching module, then execution proceeds to step 314. Otherwise, other registered request listeners may be asked to provide a module, until a match is found or there are no more request listeners.

If no request listeners are found, or if no request listeners can provide the requested module, execution proceeds to step 306. However, in one embodiment, if one or more request listeners are registered for the requesting module, and none of them are able to provide a matching module, then execution may stop after step 304. In step 306, the central framework instance checks the list of modules to determine whether one of the modules matches the module descriptor. If a match is found, then in step 308 the framework instance checks whether the matched module is multi-instantiable. If not, then execution proceeds to step 314.

If the matched module is found to be multi-instantiable in step 308, then the central framework instance may continue to search through the module list for a match. If there are no more modules to search, execution proceeds to step 310. In step 310, the framework instance searches for module-provider modules in the module list. Module-provider modules are modules capable of providing a requested module. For example, a network lookup service may be imported as a module-provider module for the containment framework.

If a module-provider module is found, then in step 312, the central framework instance notifies the module-provider module of the request and instructs it to attempt to provide a module which matches the module request descriptor. If a match is found then execution proceeds to step 314. If the module provider cannot provide the requested module, the central framework instance may search for other module-provider modules and repeat step 312. If no module providers are present in the module list or if none can provide the requested module, then the requestor is notified that the request cannot be fulfilled, and execution completes.

Step 314 may be reached from step 304, 308, or 312. In all cases, a module is found which matches the module request descriptor. In step 314 the requestor is registered as a user of the matched module, and in step 316 a reference to the matched module is returned to the requester. Any necessary initialization steps involved in loading and initializing the matched module are also performed in step 314. For example, modules may have an Initialize method that is called when a module is loaded.

As noted above, the flowchart of FIG. 16 is exemplary, and various embodiments may have different lookup/load scenarios. For example, a module may call a central framework method to load a service module without returning a reference to the matched module, or request listeners may be ignored in some cases, etc.

Figure 17:
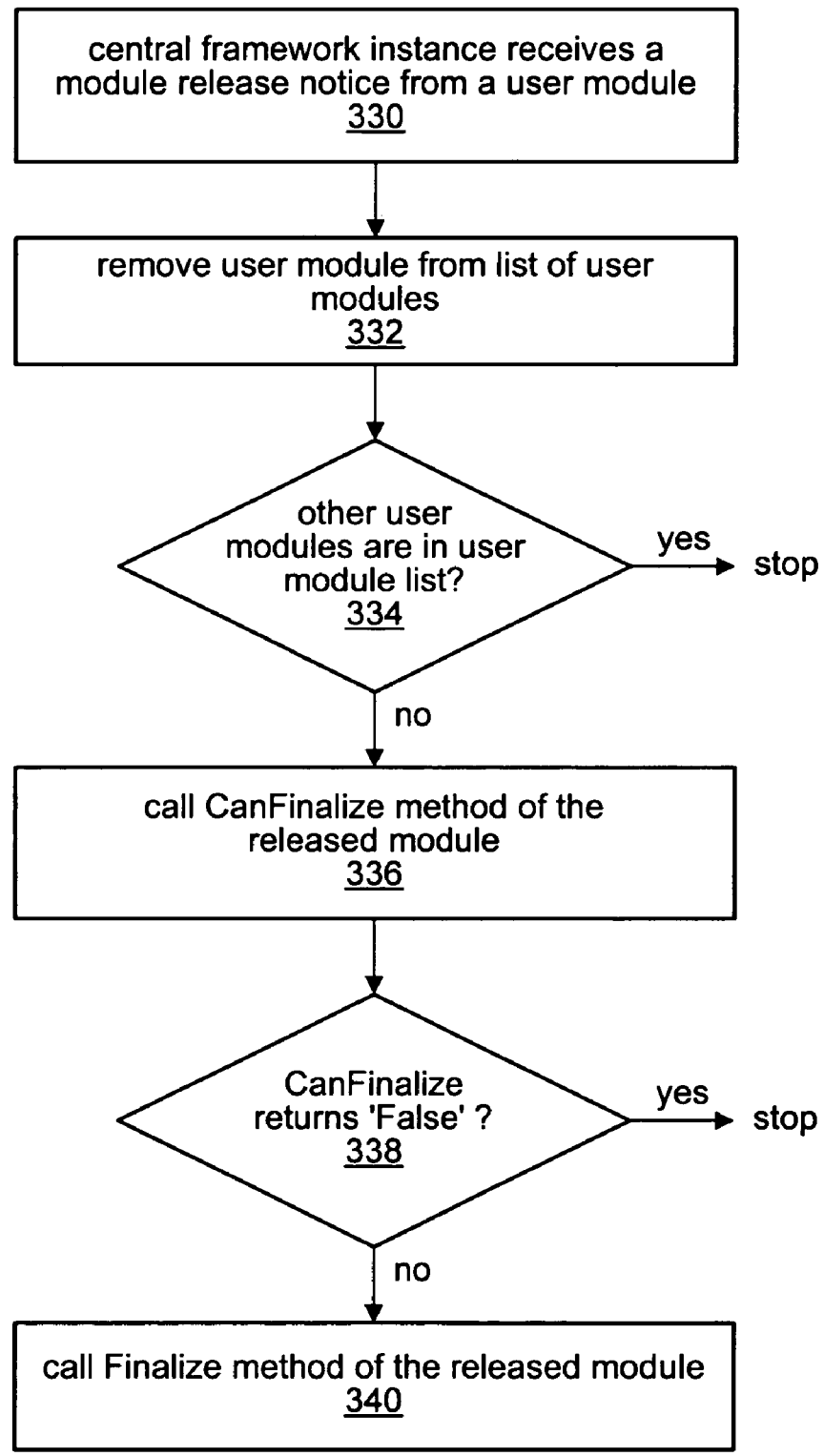
FIG. 17 is a flowchart diagram illustrating the module release process.

FIG. 17—Module Release Flowchart Diagram

When a client module is finished using a service module, the client may call a method of the central framework instance to release the module. FIG. 17 is a flowchart diagram illustrating the module release process. The flowchart of FIG. 17 is exemplary, and various steps may be combined, omitted, added, or modified as required or desired for different embodiments.

In step 330, the central framework instance receives a module-release notice from a user module. As described above for FIG. 16, when a user module requests a service module, the user module is added to a list of users of the service module. In step 332, the central framework instance removes the releasing user module from the list of users of the released module. In step 334, the framework instance determines whether any other user modules are using the released module, e.g., by checking whether other modules are present in the releases module's user module list. If so, then execution stops.

If no other modules are using the released module, the central framework instance may attempt to unload the released module. In step 336, the framework instance may call a CanFinalize method of the released module. The CanFinalize method returns true if the module can be unloaded, or false otherwise. If the CanFinalize method returns false in step 336, then execution stops. Otherwise, a Finalize method of the released module may be called. The Finalize method may perform any necessary steps for unloading the module, such as releasing resources. The module may then be unloaded, which may involve garbage-collection, etc., depending on the particular embodiment.

Although the present invention has been described in connection with specific embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A system for creating persistent references to data sources comprising:
   a handheld device, wherein said handheld device includes a processing unit and system memory;
   a software framework stored in said system memory, wherein said software framework supports program modules, wherein said program modules implement computing services;
   a first computing service implemented by one or more of said program modules, wherein said first computing service is operable to create a persistent reference to a data source in response to a user selecting said data source, wherein said data source is an email;
   a second computing service implemented by one or more of said program modules, wherein said second computing service is operable to access said data source using said persistent reference; and
   an activation framework operable to create an entity encapsulating said data source, wherein said persistent reference created by said first computing service references said entity encapsulating said data source.

2. The system of claim 1, wherein said activation framework is further operable to invoke said second computing service to perform an operation on said data source.

3. The system of claim 1 wherein said activation framework comprises a JavaBeans Activation Framework.

4. The system of claim 1, wherein said software framework requires less than 300 kilobytes of memory.

5. The system of claim 1, wherein said handheld device comprises less than 2 megabytes of memory.

6. The system of claim 1, wherein said handheld device comprises a display screen smaller than twenty square inches.

7. The system of claim 1, wherein said handheld device is battery operated.

8. A system for creating persistent references to data sources comprising:
   a handheld device, wherein said handheld device includes a processing unit and system memory;
   a software framework stored in said system memory, wherein said software framework supports program modules, wherein said program modules implement computing services;
   a first computing service implemented by one or more of said program modules, wherein said first computing service is operable to create a persistent reference to a data source in response to a user selecting said data source, wherein said data source is a web page;
   a second computing service implemented by one or more of said program modules, wherein said second computing service is operable to access said data source using said persistent reference; and
   an activation framework operable to create an entity encapsulating said data source, wherein said persistent reference created by said first computing service references said entity encapsulating said data source.

9. The system of claim 8, wherein said activation framework is further operable to invoke said second computing service to perform an operation on said data source.

10. The system of claim 8, wherein said activation framework comprises a JavaBeans Activation Framework.

11. The system of claim 8, wherein said software framework requires less than 300 kilobytes of memory.

12. A system for creating persistent references to data sources comprising:
   a handheld device, wherein said handheld device includes a processing unit and system memory;
   a software framework stored in said system memory, wherein said software framework supports program modules, wherein said program modules implement computing services;
   a first computing service implemented by one or more of said program modules, wherein said first computing service is operable to create a persistent reference to a data source in response to a user selecting said data source, wherein said data source is an appointment entry;
   a second computing service implemented by one or more of said program modules, wherein said second computing service is operable to access said data source using said persistent reference; and
   an activation framework operable to create an entity encapsulating said data source, wherein said persistent reference created by said first computing service references said entity encapsulating said data source.

13. The system of claim 12, wherein said activation framework is further operable to invoke said second computing service to perform an operation on said data source.

14. The system of claim 12, wherein said activation framework comprises a JavaBeans Activation Framework.

15. The system of claim 12, wherein said software framework requires less than 300 kilobytes of memory.

* * * * *